United States Patent [19]

Obinata

[11] 4,288,218
[45] Sep. 8, 1981

[54] HEATING APPARATUS
[75] Inventor: Akio Obinata, Suzaka, Japan
[73] Assignee: Orion Machinery Co., Ltd., Nagano, Japan
[21] Appl. No.: 95,237
[22] Filed: Nov. 19, 1979
[51] Int. Cl.³ .............................................. F24H 1/00
[52] U.S. Cl. .................................... 432/222; 432/219
[58] Field of Search ........................ 432/219, 222, 223
[56] References Cited

U.S. PATENT DOCUMENTS

| Re. 27,396 | 6/1972 | Hemmert | 432/223 |
| 3,073,583 | 1/1963 | Woollen, Jr. | 432/223 |
| 3,540,707 | 11/1970 | Warmbrodt | 432/222 |
| 4,129,410 | 12/1978 | Nowick et al. | 432/222 |

Primary Examiner—John J. Camby
Attorney, Agent, or Firm—Toren, McGeady and Stanger

[57] ABSTRACT

An infrared heater includes a combustion chamber having a radiator with a surface arranged to direct radiant heat in a forward heating direction. A fan has an outlet opening which is located to direct a flow of air above the radiating surface, thereby deflecting convective air heated by the combustion chamber in the forward direction. The fan is mounted above and on the rear side of the chamber so that it is out of the influence of radiant and convective heat developed by the chamber. A motor which drives the fan is mounted at one end of the fan so that the motor is also not affected by the radiant and convective heat.

9 Claims, 5 Drawing Figures

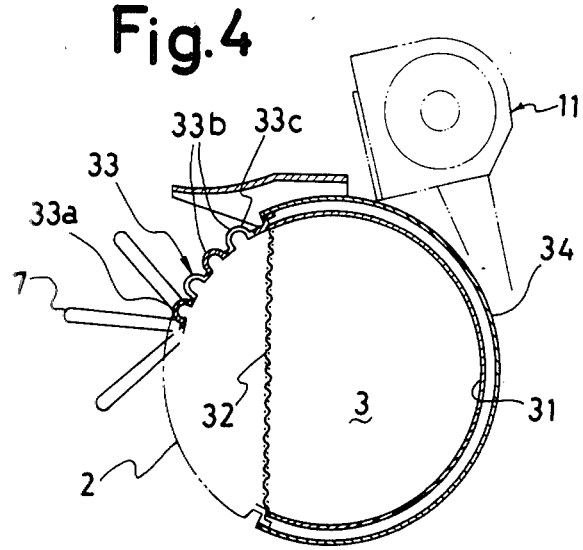
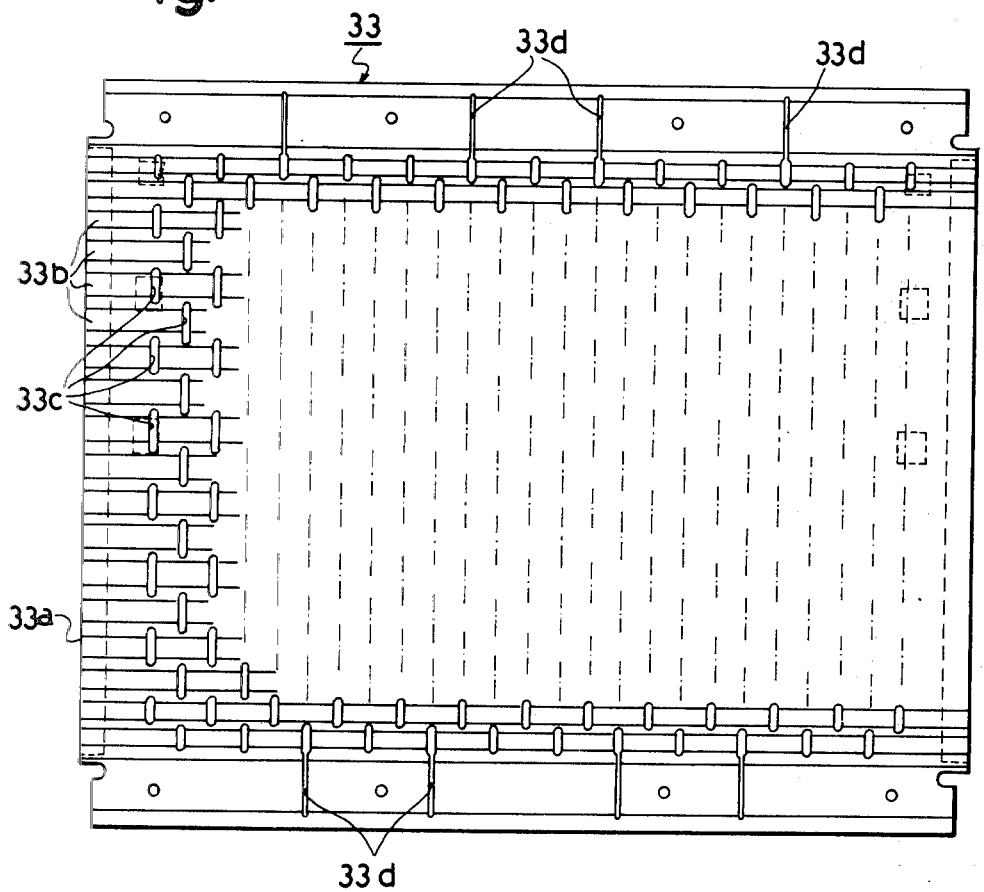

HEATING APPARATUS

BACKGROUND OF THE INVENTION

The present invention related generally to heating apparatus, and more particularly to heating apparatus including a radiator which is brought to red heat by combustion of a fuel.

Conventional fuel combustion heating apparatus is generally known as an infrared ray heater. In the conventional infrared ray heater, about 55% of the thermal energy generated by the combustion of fuel is radiated from the heater radiator element in a given direction, usually forward of the heater, while the rest of the thermal energy flows into the surroundings as exhaust heat in a spontaneous convection merely raising the temperature near the ceiling. This renders the heating operation, with the conventional heater, quite inefficient.

Further, when articles to be dried are placed in front of the known infrared ray heater for a long period of time, the temperature differences between the portions of the articles facing the heater and the portions of the articles facing in the opposite direction are significantly large and cause the articles to deflect or warp due to differences in thermal expansion. The conventional infrared ray heater has the further disadvantage that it is necessary to rotate the articles to accelerate drying, and to arrange a number of the articles equidistant from the heater to obtain even drying. This is not only troublesome, but inefficient as well.

An object of the present invention is to overcome the above and other disadvantages in conventional heaters, and to provide a heater of high efficiency including an infrared ray heater and a fan for deflecting heated convective air in the same direction as the radiated heat.

In accordance with the present invention, a heating apparatus comprises a combustion chamber including a generally cylindrical housing, and a radiator forming a part of the housing and having a radiating surface which extends over the axial length of the chamber for directing radiant heat in a forward heating direction. A fan has an outlet opening substantially coextensive with the radiating surface in the axial direction of the chamber to deflect convective air heated by the chamber in the forward direction. The fan is mounted above and to the rear side of the chamber housing so that the fan is out of the influence of radiant and convective heat developed by the chamber. A motor is mounted at one end of the fan so that it is also out of the influence of the radiant and convective heat.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing;

FIG. 4 is a sectional view of the apparatus in FIG. 1 showing details of the combustion chamber forming a part of the apparatus; and FIG. 5 is an enlarged plan view of a metal plate forming a part of the combustion chamber.

DETAILED DESCRIPTION OF THE INVENTION

Figure 1:
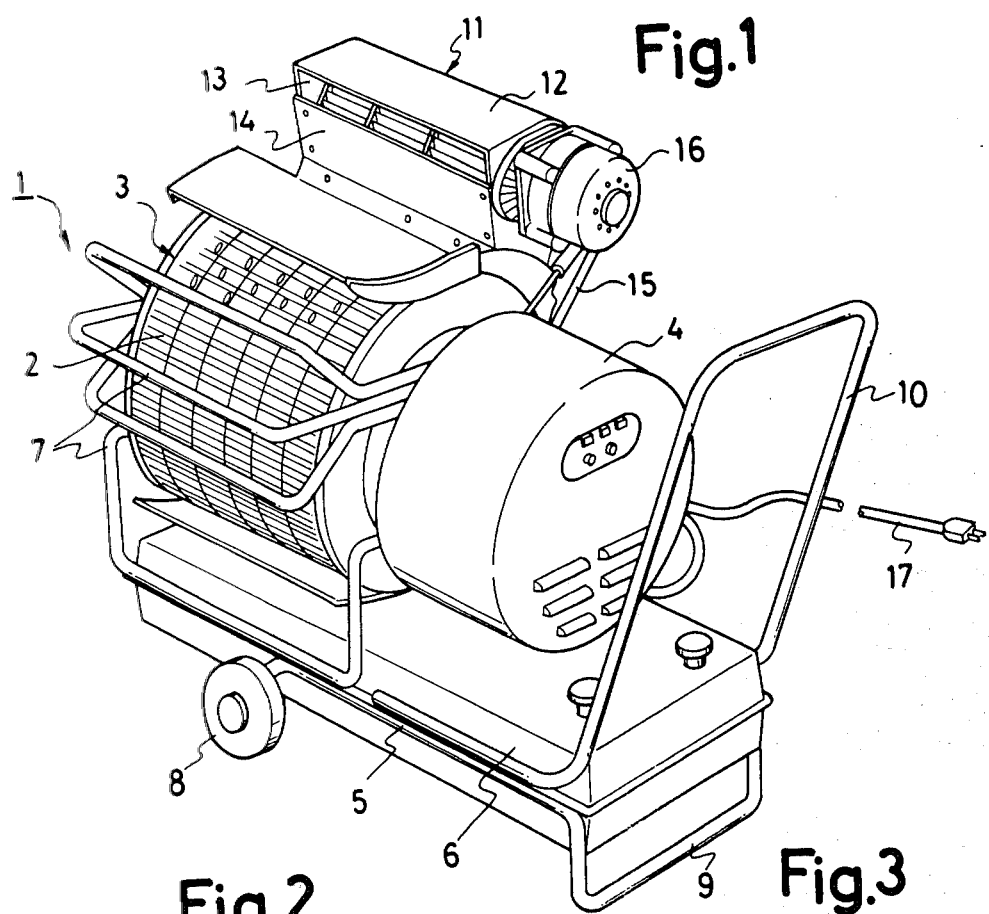
FIG. 1 is a perspective view of a heating apparatus according to the present invention.
Figure 2:
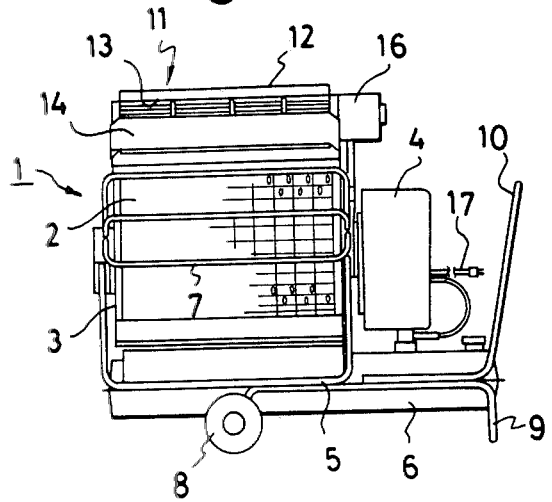
FIG. 2 is a front elevational view of the heating apparatus of FIG. 1.
Figure 3:
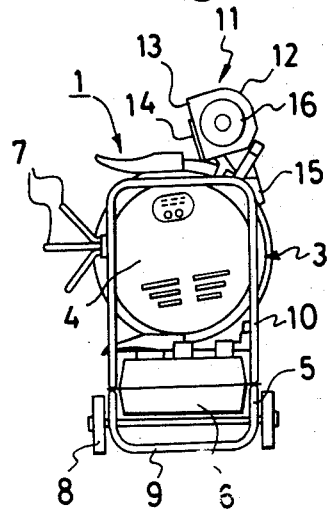
FIG. 3 is an elevational view of the apparatus as viewed from the righthand side in FIG. 2.

Referring to FIG. 1, an infrared ray heater 1 includes a combusion chamber 3 having a generally cylindrical housing. The radially outer wall of the chamber housing is formed in part by a radiator 2 which has a radiating surface facing forward of the heater 1. A metal casing 34 (FIG. 4) is joined to the radiator 2 along its edges in the axial direction of the chamber 3 to form the remainder of the radially outer housing wall. A combustion control unit 4 houses a fan and a fuel feeding device (both not shown) and is arranged on one end wall of the combustion chamber housing. The foregoing parts are carried by a truck 5, and a fuel tank 6 is fixed on the truck 5 from which fuel as well as air can be fed to the combustion chamber 3. Combustion within the chamber 3 brings the radiator 2 to a red heat condition. The casing 34 is also mounted to the truck 5.

As shown in FIG. 4, the combustion chamber 3 also includes an inner circumferentially extending wall 31 of refractory heat insulating material to prevent heat flow through the casing 34. Wall 31 forms part of a cylinder, having a cross section which is approximately semi-circular. Wall 31 is spaced a given distance from the casing 34 in the radial direction of the chamber 3, and is joined to the casing 34 along its edges extending in the axial direction of the chamber. An inorganic fiber refractory mesh screen 32 extends in a plane parallel to the axis of the chamber 3 to allow the radiator 2 to be heated by the chamber combustion. Screen 32 is joined to the edges of the wall 31 extending in the direction of the chamber axis. A convex perforated metal plate 33 covers the refractory inorganic fiber mesh screen 32 to form the radiator 2, the plate 33 facing or curving out in the forward direction from the heater 1.

As shown in FIG. 5, the perforated metal plate 33 includes a corrugated base metal sheet 33a provided with ridges 33b extending generally parallel to each other and projecting at given intervals in a radially outward direction relative to the chamber 3. Each ridge 33b has a plurality of perforations 33c therein. Perforations 33c define a total open area of about 11.7% to 12.6% of the total surface area of the perforated metal plate 33. Slits 33d are provided as desired to extend from perforations 33c at the upper and lower ends of the metal plate 33, the slits preventing deflection or warping of the metal plate 33 from heat expansion.

The heater 1 also has a guard bar assembly 7 for preventing an operator or other persons from coming into close contact with the radiator 2 while the heater is in use. The assembly 7 includes a set of three cylindrical bars which extend parallel to each other in the axial direction of the radiator 2, and bend at right angles to be fixed against the chamber housing end walls. Heater 1 also has a pair of wheels 8, a leg 9 and a handle 10. A fan 11 is fixed above the housing of the combustion chamber 3, on the rear side thereof opposite the radiator 2. The fan 11 comprises a cylindrical cross flow or centrifugal fan whose axial length is substantially the same as that of the radiator 2. The fan 11 has a case 12 provided with an elongated air outlet opening 13 which extends over a length which is also substantially the same as the axial length of the radiator 2. Brackets 14,15 firmly fix the fan 11 to the housing of the combustion chamber 3. One of the brackets 14 serves as a forward wall of the fan case 12, and the other bracket 15 extends behind the case 12. A motor 16 for driving the fan 11 is fixed to one end of the fan case 12 so that the motor shaft is coaxially aligned with the fan 11. Motor 16 is connected to an electric power source by means of a control switch (not shown) provided in the combustion controller 4, and by an electric cord 17.

With the heating apparatus constructed as above, fuel is burned in the combustion chamber 3 by suitably operating the combustion controller 4 while motor 16 is energized to drive the fan 11.

Radiator 2 is brought to a red heat condition by the combustion in the chamber 3, and thermal and infrared rays radiate from the outer surface of the radiator 2. At the same time, air heated by the combustion tends to draft upwardly out from the combustion chamber 3 and through the perforations 33c in the metal plate 33 by so-called spontaneous convection. However, since the fan 11 is provided above and to the rear of the combustion chamber housing with its air outlet opening 13 facing in the forward direction, the hot convective air from chamber 3 is deflected in the forward direction after mingling with the air blown from the fan outlet opening. Articles which are placed in front of the infrared ray heater 1 receive both the heat radiating from the radiator 2, and the hot air deflected by the fan 11 so as to be heated uniformly and efficiently.

Inasmuch as the convective hot air is deflected by the operation of fan 11 which forces movement of the air, a rise in the room temperature near the ceiling can be avoided so that the room temperature is distributed uniformly. Heating efficiency is therefore improved.

Since the fan 11 is provided above and on the rear side of the combustion chamber housing, there is no chance of hot air being sucked into the fan case 12, nor of the fan 11 becoming overheated. Moreover, the convective hot air from the infrared heater 1 is effectively deflected in the forward heating direction. The motor 16 which drives the fan 11 is provided at one end of the fan, so that it also is on the rear side of the chamber 3 so as to prevent the motor 16 from direct exposure to thermal radiation from the surface of the radiator 2, and the convective hot air. Thus, there is no danger of the motor being overheated.

The fan 11 is preferably an elongated, cylindrical cross flow or centrifugal fan in order to guarantee a sufficient amount of air flow, as well as to suppress noise. The height of the fan is made as small as possible in order to improve the stability of the infrared ray heater 1. The fan shaft can extend through one end of the fan case 12 so as to facilitate the installation of the motor 16. The structure of the fan 11 and the installation of the motor 16 can be modified provided they remain substantially out of the influence of the radiant and convective heat developed by the chamber 3.

An air flow guide member is mounted at the top of the combustion chamber housing downstream of the air outlet opening 13 of the fan 11. The guide member extends over the axial length of the radiator 2, and projects in the forward direction relative to the radiator 2 to control the deflection of heated convective air from chamber 3 by the air supplied from the fan outlet opening 13. The cross section of the guide member is curvilinear above the radiator 2, as shown in FIG. 4.

From the foregoing it will be understood that the heating apparatus of the present invention operates to deflect convective hot air which has heretofore been substantially lost, by the air flow from the outlet opening 13 of the fan 11. The heater 1 thereby functions as a hot air conditioner or device which directs the flow of heat so as to efficiently raise the room temperature. That is, uneven heating experienced with conventional heaters is compensated without spoiling the directional characteristics of the thermal radiation of the heater, and uniform heating is achieved. Moreover, as the deflected hot air will force movement of air within the room, the room temperature distribution becomes more even and the heat from the combustion is thoroughly utilized for desired heating. Heating efficiency is thereby remarkably improved.

While specific embodiments of the invention have been shown and described in detail to illustrate the application of the inventive principles, it will be understood that the invention may be embodied otherwise without departing from such principles.

What is claimed is:

1. A heating apparatus comprising a combustion chamber including a generally cylindrical housing, a radiator forming a part of the exterior of said housing and having a radiating surface which extends over the axial length of said chamber for directing radiant heat in a forward heating direction transverse to the axis of said chamber so that an object located away from said chamber in the forward heating direction is directly heated by radiation, casing means on the exterior of said housing for reducing heat radiation from said radiator in directions other than the forward heating direction, fan means including an elongated case which forms an outlet opening substantially coextensive with said radiating surface in the axial direction of said chamber for deflecting convective air which rises above the exterior of said chamber in said forward direction, said case being mounted to said casing means above said chamber on the rear side of said chamber facing opposite said heating direction so that said fan means is out of the influence of radiant and convective heat developed by said chamber, said outlet opening facing in the same direction as said forward heating direction, and a motor mounted at one end of said fan means for driving said fan means so that said motor is out of the influence of said radiant and convective heat.

2. A heating apparatus according to claim 1, wherein said fan means comprises an elongated cylindrical centrifugal fan and said case is of substantially the same length as that of said radiating surface in the axial direction of said chamber, said motor being fixed to one end of said case.

3. Heating apparatus according to claim 1, wherein said cylindrical housing includes a casing joined to said radiator to form the remaining part of said housing, inner wall means of refractory material extending within said casing for preventing heat flow through said casing, and a refractory mesh screen extending within said housing in a plane parallel to the axis of said chamber for allowing heat developed within said chamber to heat said radiator.

4. Heating apparatus according to claim 1, wherein said radiator comprises a sheet metal plate including a number of ridges extending generally parallel to each other and projecting at given intervals in the radially outward direction relative to said chamber.

5. Heating apparatus according to claim 4, wherein each of said ridges has a plurality of perforations therein.

6. Heating apparatus according to claim 5, wherein said perforations define a total open area of between 11.7 to 12.6% of the total surface area of said metal plate.

7. Heating apparatus according to claim 1, comprising guard bar means fixed to said housing and extending directly above said radiator for preventing close contact with said radiator by a bystander, said guide bar means including a number of cylindrical bars extending parallel to each other in the axial direction of said housing.

8. Heating apparatus according to claim 1, comprising an air flow guide member mounted at the top of said housing downstream of said fan outlet opening for controlling deflection of convective air from said chamber toward said forward heating direction.

9. Heating apparatus according to claim 8, wherein said guide member extends over the axial length of said radiator and projects toward said forward heating direction.

* * * * *